United States Patent [19]
Pachynski, Jr.

[11] 3,995,119

[45] Nov. 30, 1976

[54] DIGITAL TIME-DIVISION MULTIPLEXING SYSTEM

[75] Inventor: Alvin L. Pachynski, Jr., Redwood City, Calif.

[73] Assignee: GTE Automatic Electric Laboratories Incorporated, Northlake, Ill.

[22] Filed: May 30, 1975

[21] Appl. No.: 582,322

[52] U.S. Cl. .......................... 179/15 AF; 179/15 BS
[51] Int. Cl.[2] ............................................. H04J 3/06
[58] Field of Search .......... 179/15 AF, 15 BS, 15 A, 179/15 BA; 178/69.5 R

[56] References Cited
UNITED STATES PATENTS 3,564,414   2/1971   Ebert ............................. 179/15 AF

FOREIGN PATENTS OR APPLICATIONS

1,140,685   1/1969   United Kingdom ............ 179/15 AF

*Primary Examiner*—David L. Stewart
*Attorney, Agent, or Firm*—Douglas M. Gilbert; Leonard R. Cool

[57] ABSTRACT

Disclosed is a digital multiplexer which combines N parallel bit-synchronized digital signals, each of bit rate $f_1$, into a single composite line signal of bit rate $f_2$, where $f_2 > Nf_1$. Before the individual bits are interleaved, each digital signal is converted to a submultiple of the line frequency, $f_2$. By inserting gaps having a predetermined duration and occurring at a fixed rate into each of the N digital signals, the bit rate $f_1$ of each bit stream is increased to $f_2/N$. This is done without sampling any bit more than once. A multiplexer sequentially interleaves each bit from the N converted bit streams along with the gaps in each bit stream, forming the composite signal of bit rate $f_2$. The interleaved gaps form empty time slots in the composite signal into which one or more signaling bits are added. Some of the added signaling bits carry framing information to lock the transmitter and receiver together. Thus, a composite higher-rate digital line signal consisting of interleaved information bits and signaling bits forms the time-division multiplex signal suitable for transmission over a single digital transmission path.

11 Claims, 9 Drawing Figures

FIG. 1  TWO CHANNEL MULTIPLEXER

"N" CHANNEL MULTIPLEXER

FIG. 4

GATED PHASE-LOCKED LOOP

TWO CHANNEL DEMULTIPLEXER

FIG. 7

"N" CHANNEL DEMULTIPLEXER

DIGITAL TIME-DIVISION MULTIPLEXING SYSTEM

FIELD OF THE INVENTION

This invention relates to digital telecommunication systems and more particularly to time-division multiplexing systems for a plurality of synchronous digital signals.

BACKGROUND OF THE INVENTION

Over the past several years, PCM (pulse-code modulation) cable carrier systems have seen tremendous growth in exchange trunk transmission. In some locations multi-pair exchange cables have become fully utilized, necessitating the addition of more cables and more line repeaters. In this surrounding, digital multiplexers have been developed for combining the digital outputs of several PCM terminals into a single, higher-rate composite bit stream. See "Digital Multiplexers", *Transmission Systems for Communications*, Fourth Edition, Chapter 26, Bell Laboratories, Inc., 1970.

The typical approach to time-division multiplexing of the digital signals from several PCM terminals, as explained in *Transmission Systems for Communications*, supra, is to consider the several bit streams as synchronous digital signals. This technique provides maximum flexibility since it permits the digital signal sources to be separated by large distances, i.e., it does not require prior synchronization of the individual bit streams. If the multiplexer input signals are asynchronous, then elastic stores must be used to periodically delay the incoming bit streams. Digital storage provided by elastic stores permits pulse stuffing to be used to increase the bit rates of all incoming signals to that of a local clock signal. Variable pulse stuffing, provided by elastic stores, permits maximum system flexibility since few constraints are placed on the PCM terminal output signals. For a full discussion of pulse stuffing, see V. I. Johannes and R. H. McCullough, "Multiplexing of Asynchronous Digital Signals Using Pulse Stuffing with Added Bit Signaling", *IEEE Transactions on Communication Technology*, October 1966, pp. 562 – 568; and U.S. Pat. No. 2,548,661.

Elastic stores and their control circuitry are unfortunately rather complex and expensive circuits, and their cost necessarily increases the overall system cost of a digital multiplexing system. Also, variable pulse stuffing requires an added information channel to inform the receive terminal of the location of the stuffed pulses. Although such information is usually sent on a time-share basis with the framing bits, it is still wasteful in the sense of requiring an added communication channel.

In contrast, the invention described herein does not require the use of elastic stores in a digital multiplexing system of the type just described. Further, the system herein makes full use of its signaling channel since only framing bits need be sent to the receive terminal. The only added requirement placed on the use of the system herein is that the digital sources be placed in close proximity so that the bit streams can be bit synchronized to the same clock signal before entering the digital multiplexer.

It is an object of this invention to provide a digital multiplexing system design technique capable of multiplexing N bit-synchronized digital signals, each at a bit rate $f_1$, into a digital composite line signal having a bit rate $f_2$, where $Nf_1 < f_2$.

It is a further object of this invention to provide a digital demultiplexer not requiring elastic stores.

SUMMARY OF THE INVENTION

This invention consists of a digital multiplexer (transmitter) and a digital demultiplexer (receiver). At the multiplexer, N synchronous bit streams, assumed to be returned-to-zero (RZ) binary pulses, are modified to nonreturn-to-zero (NRZ) binary pulses. These NRZ bit streams are then sampled in a flip-flop controlled by a multiplexer clock, $f_1'$. The multiplexer clock signal $f_1'$ causes the N bit streams to be sampled at a rate $f_2/N$, which is somewhat higher than the incoming bit stream rate, $f_1$. Before any incoming bit can be read twice, however, the multiplexer clock is momentarily stopped for a predetermined period of time. By stopping the multiplexer clock, the sampling flip-flop is inhibited and gaps are created in the sampled output bit stream. The gaps (or empty time slots) have a duration of at least one $f_2$ data time slot ($1/f_2$ seconds), but not greater than N data time slots ($N/f_2$ seconds), which permits pulse stuffing of signaling bits in the output line signal. Before any incoming bits are dropped (not sampled), the multiplexer clock is again started to assure that each bit is sampled once. This on/off sampling maintains the average sampling rate at $f_1$, i.e., the average bit rate of the multiplexer sampling clock $f_1'$ and the incoming bit rate $f_1$ are the same over a long period of time. The sampling process converts the bit rate of each bit stream from $f_1$ to $f_2/N$. Being a submultiple of the composite line signal, $f_2$, permits the converted bit streams to be easily interleaved in a sequential manner by N flip-flops properly timed. Once a single composite signal is formed, signaling bits can be inserted in the gaps created during the sampling process. The signaling bits contain framing information to permit the receiver to identify the framing pattern.

At the demultiplexer, digital counters and reframing circuits generate a clock signal, $f_b$, which identifies the interval in which the signaling bits are located. From this signal the multiplexing sequence can be determined to demultiplex the received composite line signal. Each bit identified with a particular bit stream is sequentially removed from the line signal. The last step in the demultiplexing process reestablishes the proper $f_1$ clock timing.

BRIEF DESCRIPTION OF THE DRAWINGS

The above and other features of the invention will be considered in the following specification in connection with the accompanying drawings in which.

DETAILED DESCRIPTION

According to the principles of this invention, in a digital communication system comprised of N synchronous bit streams, multiplexed at a line rate of $f_2$, where $f_2 > Nf_1$, there is a third signal, $f_s$, which is useful in defining the relationship between $f_1$ and $f_2$ as follows, $f_2 = Nf_1 + f_s$. $f_s$ is termed the nominal stuffing rate, and it defines the number of bits or more precisely the number of time slots (per unit of time) that must be added to N bit streams to permit time division multiplexing of all N bit streams at a line bit rate of $f_2$. Thus, $f_s = f_2 - Nf_1$.

To understand the principles of this invention, it is useful to define another term, the stuffing ratio $S_R$, which is defined as $$S_R = Nf_1/f_s = \frac{Nf_1}{f_2 - Nf_1} = \frac{\text{Number of information time slots}}{\text{Number of stuffed time slots}}.$$

For example, if $S_R = 24$ in a particular multiplexing system, then after every 24 information time slots the multiplexer must insert one added time slot. In asynchronous multiplexing systems using elastic stores, both $f_s$ and $S_R$ are variables since $f_2$ is fixed. In the invention herein, $S_R$ is fixed by system design.

The multiplexing principle behind this invention may be explained as follows. If a clock signal $f_1'$, equal to a frequency of $f_2/N$, were used to control the sampling of N incoming bit streams (of rate $f_1$), $f_s$ data bits per second would be sampled twice. A digital multiplexer which permitted multiple sampling of a single bit would have inherent transmission errors, which is an unacceptable condition. To prevent this from happening the $f_2/N$ sampling is momentarily stopped for a period of time less than $\tau_1$, where $\tau_1 = 1/f_1$, so as to maintain the average sampling frequency over at least one frame at the incoming bit rate $f_1$. If the average sampling rate and the input bit rate are the same, $f_1$, and if the interruption in the sampling is less than the duration of one $f_1$ bit, no sampled bit will be sampled more than once, and every bit will be sampled at least once. By placing one further condition on the system, namely that the sampling be interrupted for at least a period of time equal to $\tau_2$, where $\tau_2 = 1/f_2$, signaling bits can be inserted in the multiplexed line in the gaps created by stopping the multiplexer sampling clock, $f_1'$.

Figures 1, 2:
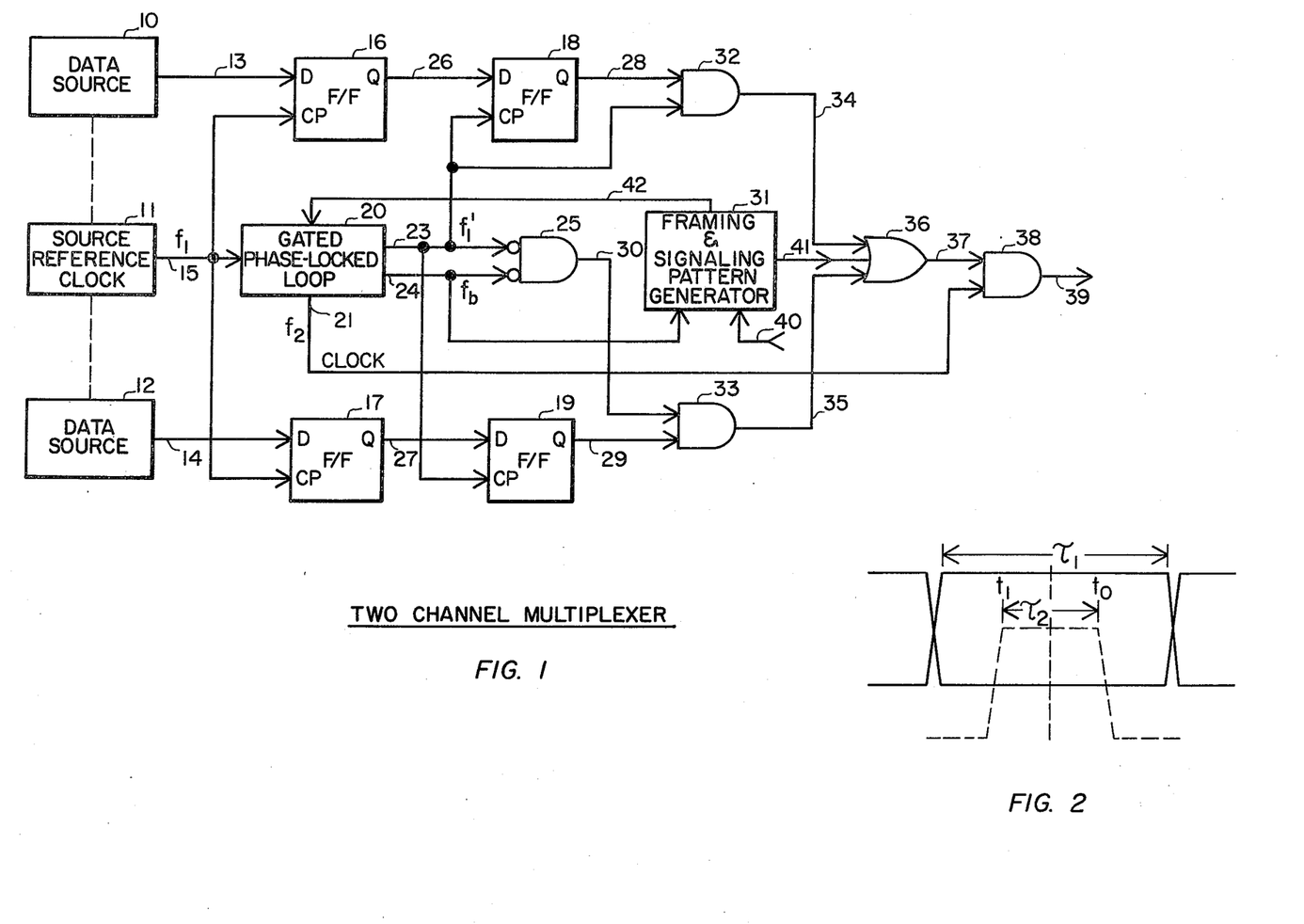
FIG. 1 is a block diagram of one embodiment of a digital multiplexer in a digital multiplexing system in accordance with the principles of this invention.
FIG. 2 illustrates the timing relationships between multiplexed line bits ($\tau_2$) and the incoming bits ($\tau_1$), for the two-channel system shown in FIGS. 1 and 5.

FIG. 2 illustrates, for a two-input system, the effect of stopping the sampling clock $f_1'$ for periods of time equal to $\tau_2$. $\tau_1$ in FIG. 1B represents the pulse width of one $f_1$ input bit, and $\tau_2$ represents the pulse width of one $f_2$ line bit. The $f_1'$ clock, operating at an instantaneous rate of $f_2/N$, causes the sampling instant of each successive bit to advance in time. If at time $t=0$ the sampling of each bit is begun at $t_0$, the point of sampling would be advanced until $t_1$ is reached. At that point, the $f_1'$ clock would be stopped for a period of time equal to $\tau_2$ to permit the sampling instant to shift to $t_0$. The net result is that the sampling instant precesses almost ± 90° about the center of the $f_1$ bit. The amount of precession of the sampling instant depends upon the relationship between $\tau_1$, $\tau_2$, and the number of consecutive $f_2$ signaling bits ($k$) which are inserted during the gap.

Figure 5:
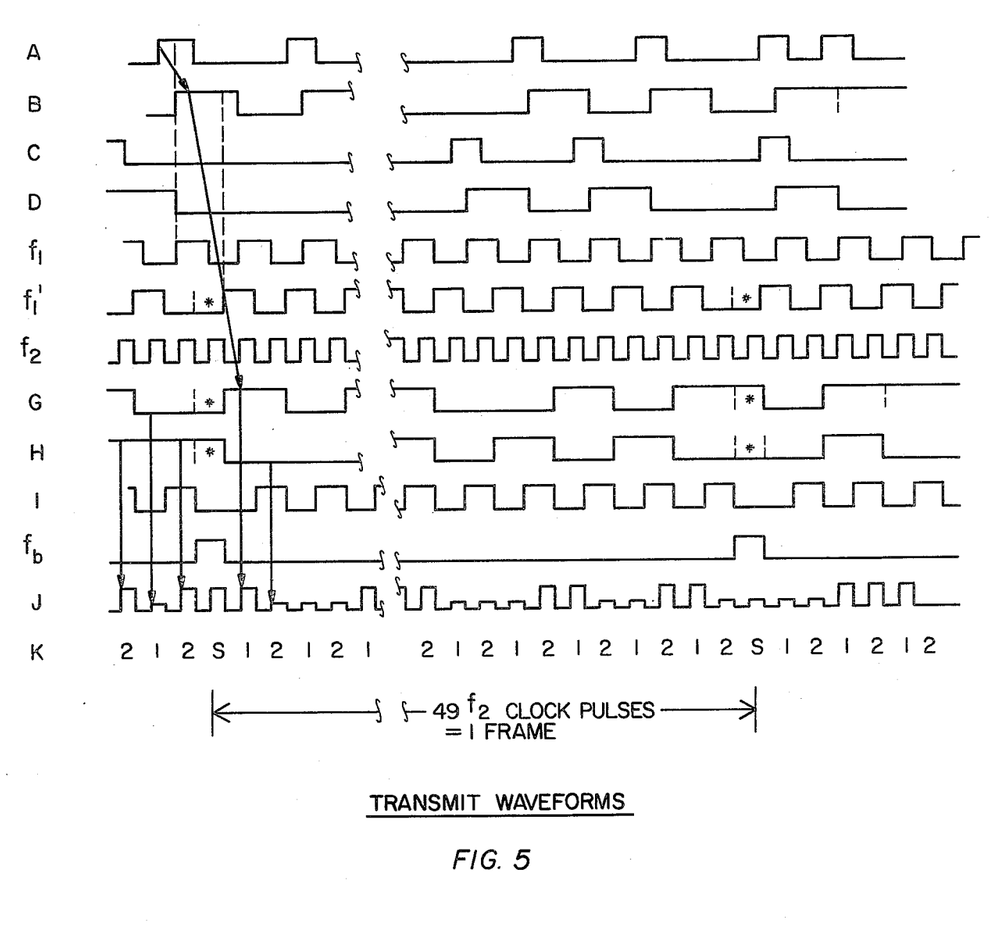
FIG. 5, including A through K, illustrates the waveforms for the multiplexer shown in FIG. 1.
Figure 6:
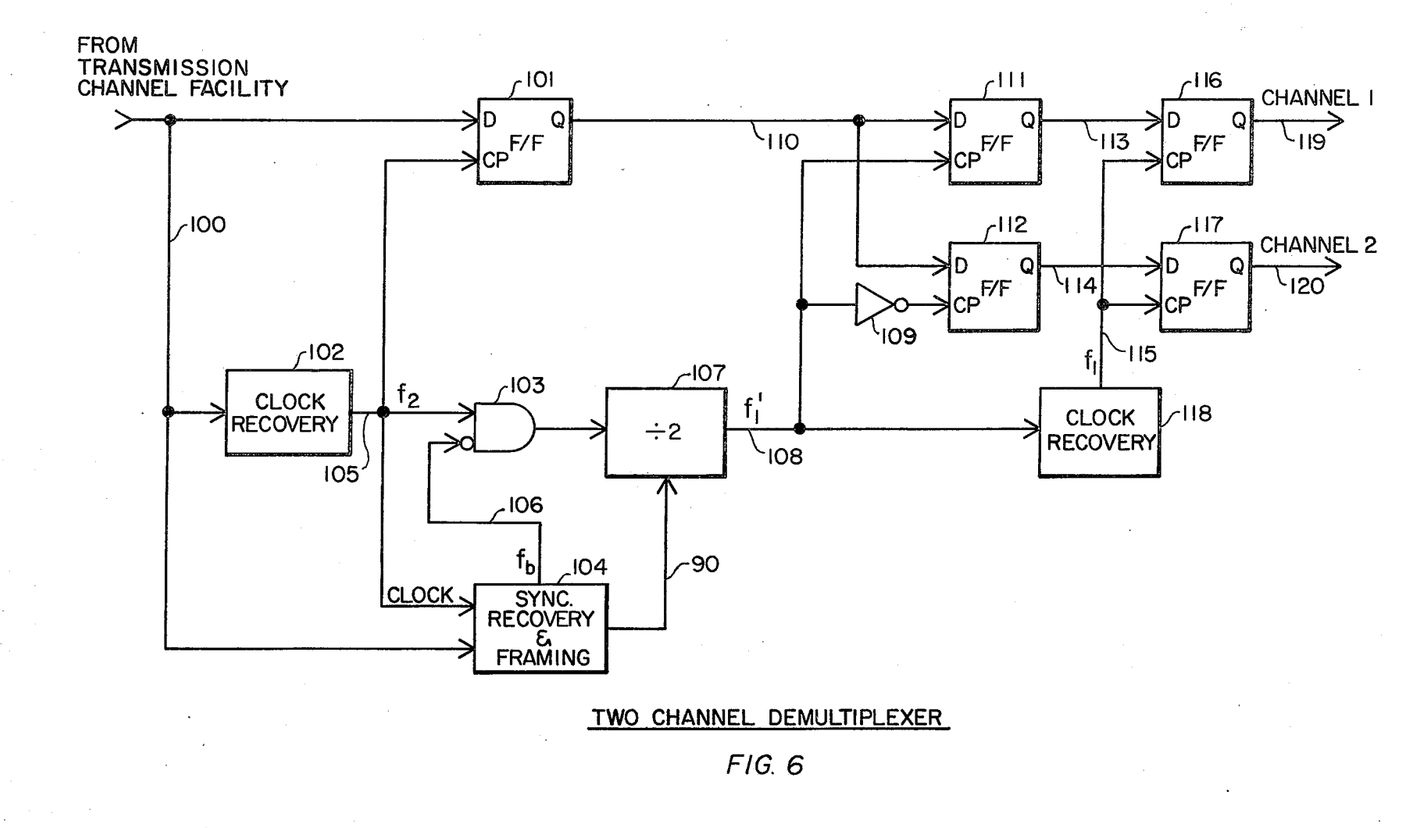
FIG. 6 is a block diagram of one embodiment of a digital demultiplexer in a digital multiplexing system, coordinating with the multiplexer shown in FIG. 1.

A two-channel digital multiplexer in accordance with the present invention is shown in FIG. 1 with its associated waveforms shown in FIG. 5. This equipment constitutes the transmitter portion of a digital communications facility. (FIG. 6 illustrates the coordinating demultiplexer). The transmission link connecting the multiplexer and demultiplexer together may comprise a wire line, a cable, or a microwave radio facility. Data sources 10 and 12 in FIG. 1 are furnished by the user of the multiplexing system, and such sources would typically comprise the transmit portion of two PCM terminals. Source reference clock 11 may also be furnished by the user of such a system, or it could easily be derived from either bit stream 13 or 14. Clock recovery circuits capable of reproducing the $f_1$ timing are well known in the art.

Data sources 10 and 12 typically provide digital synchronous RZ (return-to-zero) bit streams on paths 13 and 14, as illustrated by waveforms A and C in FIG. 5. Although some PCM terminals may provide NRZ bit streams (nonreturn to zero), the RZ condition has been assumed here since this is a more general condition. Waveforms A and C in FIG. 5 represent RZ PCM binary signals at typically a basic repetition rate of 1.544 Mb/s.

Devices 16 and 17 in FIG. 1 are D-type flip-flops (sometimes called "T-type" flip-flops) and are positive-going, edge-triggered devices. Their purpose is to convert the RZ input signals on paths 13 and 14 applied at the D-inputs to NRZ bit streams at the Q-outputs on leads 26 and 27. The reason the conversion is made to NRZ, as will be seen, is to allow a greater time interval in which stuffed bits may be added to the multiplexed line signal. The second inputs of flip-flops 16 and 17, labelled CP, are connected to the clock signal on lead 15 which provides the reference clock signal $f_1$ (shown as the $f_1$ waveform in FIG. 5). Flip-flops 16 and 17 assure that the output NRZ bit streams on leads 26 and 27 have a common $f_1$ timing.

The reference clock signal $f_1$ at 15 is also connected to gated phase-locked loop 20 (GPLL), which generates timing signals $f_1', f_b$, and $f_2$. The $f_2$ clock signal, illustrated by waveform $f_2$ in FIG. 5, is the reference clock signal of the composite line signal. The $f_1'$ clock signal is used to control the sampling of the input bit streams on paths 26 and 27. This clock signal is illustrated as waveform $f_1'$ in FIG. 5 and will be discussed in greater detail subsequently. The $f_b$ clock signal indicates the position and duration of the gaps (a blanking interval) inserted into each bit stream. $f_b$ is illustrated as waveform $f_b$ in FIG. 5. As illustrated in FIG. 5, $f_b$ has a pulse duration sufficient to allow the insertion of only one added bit, $\tau_2$ in duration. In this example, multiple signaling bits cannot be added and therefore the rate of $f_6$ equals $f_s$. In general, however, $kf_b = f_s$, where $k$ indicates the number of consecutive bits which are added during the blanking interval.

Following flip-flops 16 and 17 in the signal path in FIG. 1 are two more D-type flip-flops 18 and 19, which are also positive-going, edge-triggered devices. The inputs to these devices on leads 26 and 27 are shown as waveforms B and D, as shown in FIG. 5. The CP clock input to both 18 and 19 is lead 23, which is shown as the $f_1'$ waveform in FIG. 5. The $f_1'$ clock signal on 23 causes the input signals on 26 and 27 to be sampled. $f_1'$ establishes the data rate on leads 28 and 29 to ½($f_2$) (except during the blanking interval which is indicated with asterisks in FIG. 5). In general, flip-flops 18 and 19 convert the bit rates of the input bit streams ($f_1$) to whatever rate is dictated by the CP input ($f_1'$).

In fixing the rate at which data should be read out of flip-flops 18 and 19, it is desirable to set the data rate at $f_2/2$. This permits a straightforward interleaving of the two bit streams to form a composite multiplexed signal at the $f_2$ line rate (3.152 Mb/s typically). If, however, the $f_1'$ clock had a continuous bit rate equal to $f_2/2$ (1.576 Mb/s), flip-flops 18 and 19 would eventually sample several data bits twice, since the $f_1'$ clock would be 32 kb/s higher than the digital data rate $f_1$. Sampling the same bit twice in a multiplex system would produce errors, and therefore multiple samples of the same bit must be avoided. To preclude sampling the same bit twice, the $f_1'$ clock must have an average bit rate equal to the write clock $f_1$. To meet the first of these objectives, $f_1'$ is generated by GPLL 20 to have an instantaneous frequency of $f_2/2$ (1.576 Mb/s). However, to preclude sampling any bit twice, precise blanking intervals (gaps) are inserted into the $f_1'$ waveform to inhibit flip-flops 18 and 19 for a time period less than one $f_1$ bit length, $\tau_1$. As explained before, these gaps are made coincident with the signaling interval and are made sufficiently long to permit from one up to N($f_2$) signaling bits to be consecutively stuffed in the composite line signal at the $f_2$ rate. (Stuffing N consecutive bits would cause a precession of the sampling instant of nearly ±180°). The two NRZ signals on paths 28 and 29 have been retimed by the $f_1'$ signal, and are shown as waveforms G and H, respectively, in FIG. 5. These two signals have an instantaneous bit rate of ½($f_2$); however, the average bit rate is only $f_1$ due to the signaling gaps in the converted bit streams. AND-gate 32 converts NRZ waveform G to an RZ signal on lead 34 by combining signals as represented by waveforms G and $f_1'$. Both input and output signals, on 28 and 34, have the same instantaneous bit rate, ½$f_2$. During the blanking interval, the output of AND-gate 32 is inhibited by $f_1'$, on 23. Like AND-gate 32, AND-gate 33 performs a similar retiming of the input on lead 29, except that its output signal on 35 is shifted 180° with respect to the signal on 34. AND-gate 25, with inverted inputs on 23 and 24, provides a new timing signal on lead 30, and is shown by waveform I in FIG. 5. Control signal 30 is an inverted $f_1'$ clock signal, except during the blanking interval. It enables the correct timing of AND-gate 33 so that the converted bit stream on 35 and the bit stream on 34 are displaced 180° with respect to each other. This allows the two signals to be directly interleaved by OR-gate 36 to form the multiplexed composite line signal on 37.

Figure 8:
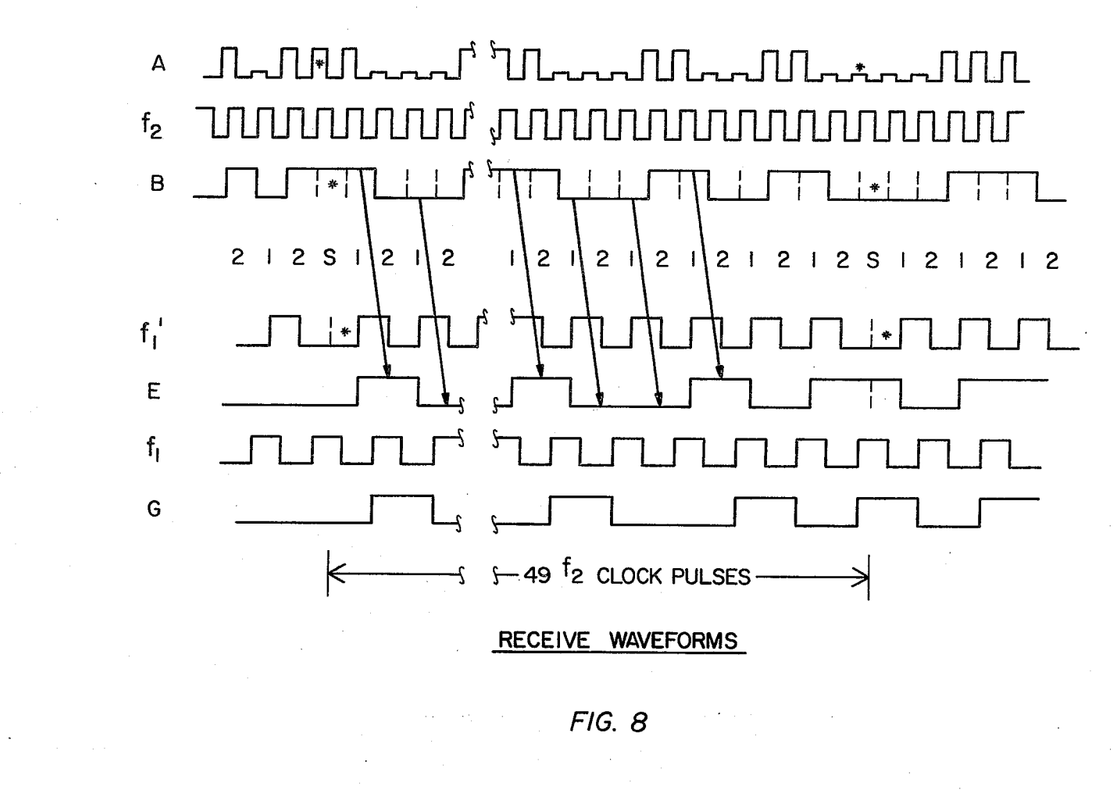
FIG. 8 illustrates the demultiplexer waveforms.

Combining the two RZ signals on paths 34 and 35 produces an NRZ signal on 37 of bit rate $f_2$, i.e., (2 × ½ $f_2$). AND-gate 38 converts the NRZ signal to the RZ signal on the output connection 39, as shown by waveform J in FIG. 5. (Line K in FIG. 5 indicates the pulse assignment of the composite line signal shown as waveform J in FIG. 5). The signaling bits are inserted before transmission during the blanking interval at OR-gate 36 and are indicated in waveform K by the "S" symbol in line K. The signaling bits (shown as a 1/0 pattern) are generated by circuitry 31 and connected to OR-gate 36 via 41. There are a number of framing and signaling pattern generators capable of generating a framing pattern from clock signal 24, $f_b$. The complexity of this generator depends upon the framing pattern desired. For a one-zero framing pattern as shown in FIG. 8 and FIG. 5, 31 could be implemented with a simple divide-by-two counter and an AND-gate. Most any other framing pattern would require more complex counters and gating circuitry. Connection 40 is used to apply external signaling to the multiplexed bit stream and could also be used on a time-share basis for a low-speed digital data input. Path 42 connecting generator 31 to GPLL 20 is required for resetting the divide-by-N counter 78 (see FIG. 4) before a complete frame. Framing generator 31 sends a resetting pulse before each frame to synchronize generator 31 and counter 78. Without this connection, counter 78 would be in an indeterminate state before each frame causing either incoming signal 27 or 28 to be sampled.

Figure 3:
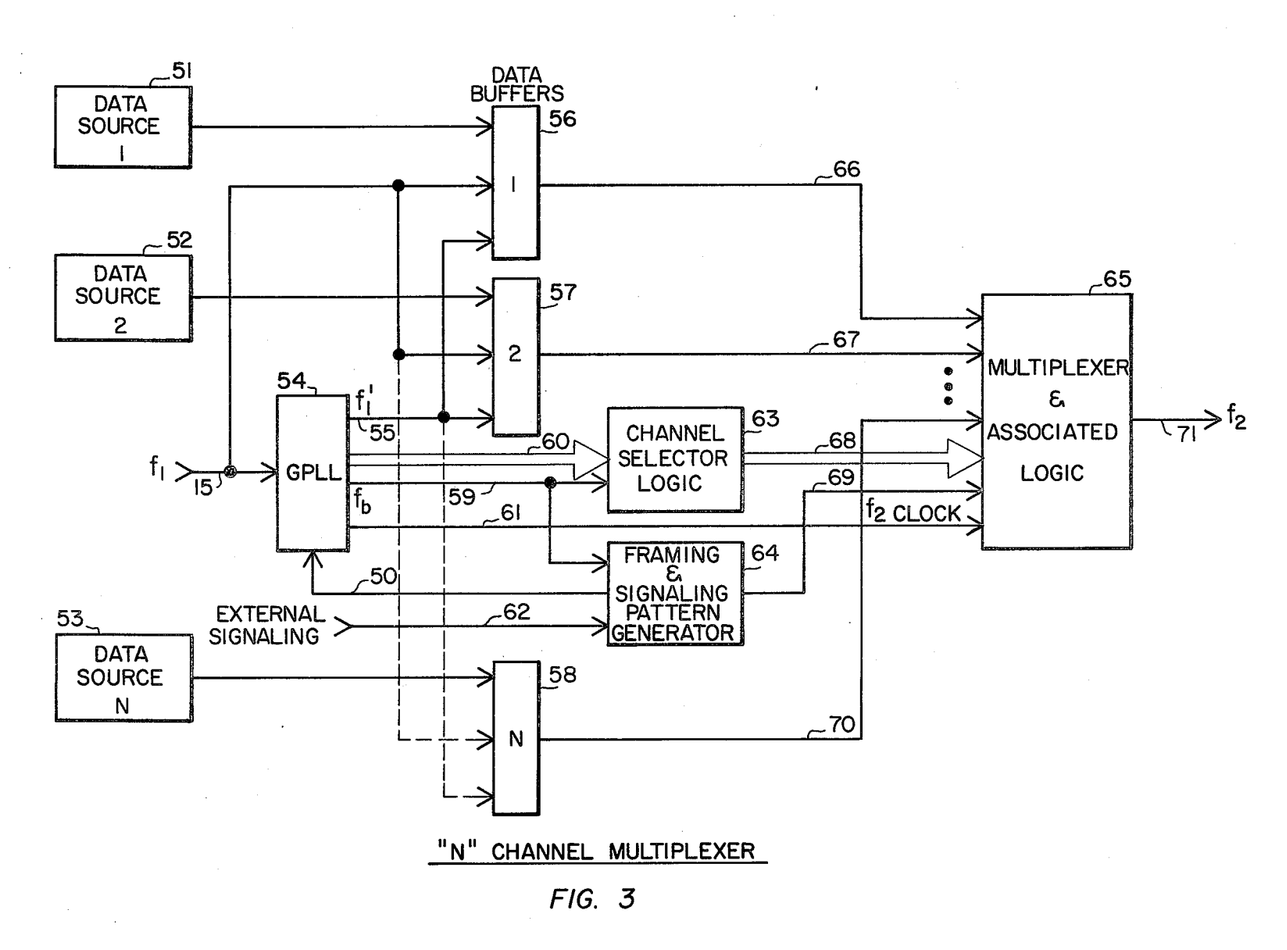
FIG. 3 is a block diagram of a digital multiplexer in a digital multiplexing system having an input capacity of N bit streams.

FIG. 3 discloses a multiplexer system capable of combining N channels of tributary data bits using the principle described in conjunction with FIG. 1. Data sources 51, 52, and 53 provide N RZ bit streams having a basic bit rate of $f_1$. As in FIG. 1, the reference clock signal $f_1$ applied on path 15 is generally furnished by the user of the system, although the clock signal may be derived from any one of the input bit streams.

Gated phase-locked loop 54 generates the sampling clock signal $f_1'$ on path 55, $f_2$ clock signal on path 61, $f_b$ on path 59, and logic pulses on path 60. The gated phase-locked loop 54 will be discussed in more detail below. Connection 60, from gated phase-locked loop 54 to channel selector logic 63, consists of a plurality of connections representing outputs from each stage of a divide-by-N binary counter (shown in FIG. 4 as 78). Blanking signal $f_b$ indicates the position and duration of the signaling gaps inserted in each bit stream. Connection 59 conducts the signal $f_b$ to logic circuit 63.

Data buffers 56, 57, and 58 retime the input signals and produce waveforms having an instantaneous bit rate of $f_2/N$ with the added signaling gaps. The waveforms on paths 66, 67, and 70 would be similar to those shown in waveforms G and H in FIG. 5. Each of the data buffers shown, 56, 57, and 58, could be implemented using D-type flip-flops connected as shown in FIG. 1 by 16 and 18. The same bit rate conversion performed by 16 and 18 is also performed by 56, 57, and 58. The multiplexer and its associated logic circuitry 65 performs the sequential interleaving of the converted bit streams and inserts the signaling bits generated by the framing and signaling pattern generator 64. There are any number of circuit techniques which can be used to implement such a multiplexer circuit capable of performing the required interleaving function. Multiplexer circuits capable of performing this function are commercially available today in integrated form. The Texas Instruments Corporation, Dallas, Texas, manufactures a device, called a "Data Selector," capable of multiplexing a number of digital signals together on a time-division basis. The composite line signal 71 would consist of the interleaved information bits at the $f_2$ rate with the added signaling and framing bits inserted. The sequential clock signals required to perform the multiplexing of the digital signals on paths 66, 67, and 70 are generated by the channel selector logic 63 and conducted to the multiplexer via leads 68. The channel selector logic 63 could easily be implemented using binary decoders or BCD-to-decimal decoders of a type manufactured by Texas Instruments Corporation, Dallas, Texas, Serial No. 7400 series.

Framing and signaling pattern generator 64 is connected to the multiplexer logic via 69. Generator 64, using the blanking signal $f_b$, generates the correct framing pattern to be inserted into the multiplexed line in multiplexer 65. Generator 64 also permits the insertion of auxiliary data bits as shown in waveforms b and c, FIG. 9. The external signaling, if used, would be inserted on connection 62 into generator 64. Such a generator could be constructed out of sequential and combinatorial logic elements as is well known, and certainly would be within the capabilities of a person of ordinary skill in the art. Refer to *Transmission Systems for Communications*, Third Edition, Bell Telephone Laboratories, Inc., 1965, pp. 640 – 644. The particular circuits chosen to implement such a generator would depend upon various factors such as the number of bit streams, the stuffing rate, the framing pattern, and whether external signaling would be required. Path 50, connecting generator 64 to GPLL 54, is required to synchronize the counter circuits in GPLL 54 with the framing pattern. This connection serves the same basic function as 42 used in FIG. 1.

Figure 4:
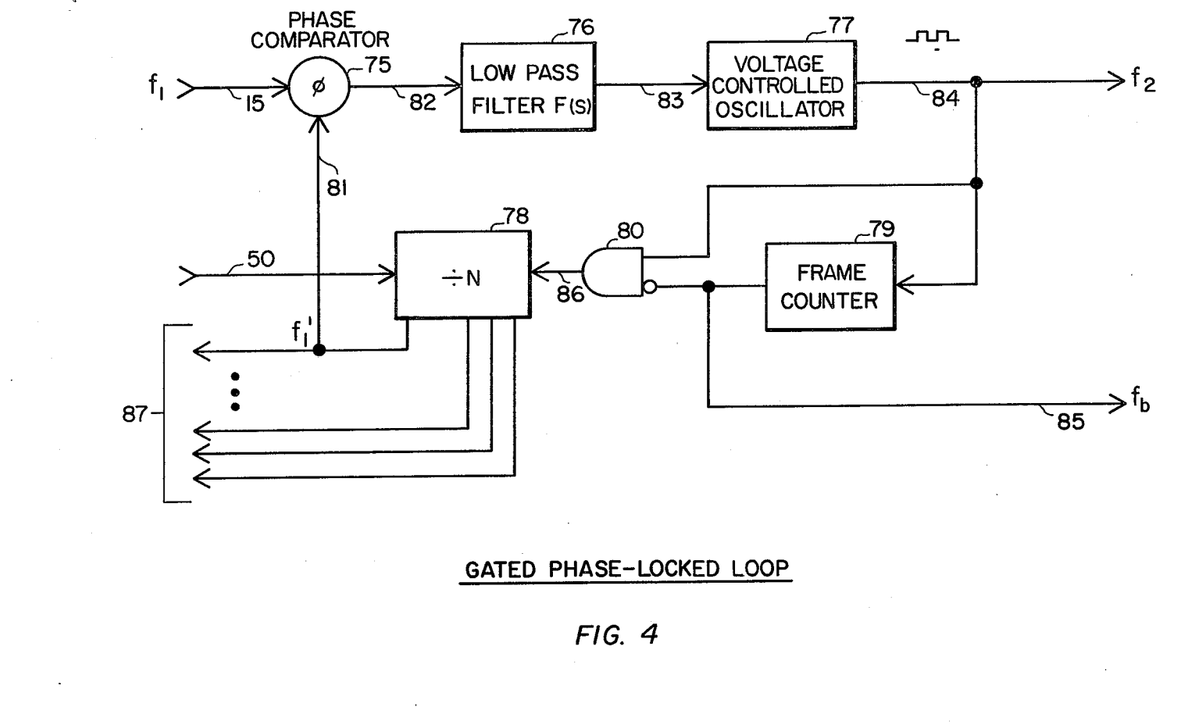
FIG. 4 is a block diagram of the grated phase-locked loop used in the multiplexer circuitry.

A particular embodiment of the gated phase-locked loop (GPLL) shown in FIG. 3 as 54 and shown in FIG. 1 as 20 is more fully illustrated in FIG. 4. The purpose of the GPLL circuit is to maintain the timing relationships between $f_1, f_1'$, and $f_2$. The GPLL comprises the standard components in a phase-locked loop; phase comparator 75, lowpass filter 76, and voltage-controlled oscillator (VCO) 77. If the output of the GPLL, lead 84, were connected directly to the feedback connection 81 of phase comparator 75, the GPLL would be in a standard phase-locked loop configuration. In the feedback loop, however, is a frame counter 79, AND-gate 80, and a digital divider circuit 78. The purpose of this feedback loop is to maintain the correct timing relationship between the sampling clock signal $f_1'$ and the composite line clock signal $f_2$.

The output 84 of VCO 77 is connected to frame counter 79 and to AND-gate 80. Frame counter 79 generates an output binary signal, $f_b$, after a predetermined number of input $f_2$ bits. In the frame format a shown in FIG. 9, frame counter 79 would generate a single bit, $1/f_2$ seconds in duration, after every 48 $f_2$ clock pulses generated by VCO 77 in FIG. 4. In the frame format shown in b and c of FIG. 9, frame counter 79 would generate a single bit after a more complex counting pattern, namely 49, 48, 48, 48, 49, 48, 48, 48 . . . The output path 85 of frame counter 79 is shown in FIGS. 1 and 3 as paths 24 and 59, respectively. For the example used in connection with FIG. 1, the $f_b$ waveform would be as shown by $f_b$ in FIG. 5. Similarly, path 84 is shown in FIGS. 1 and 3 as paths 21 and 61, respectively. Signals $f_b$ and $f_2$ are combined at AND-gate 80, as shown in FIG. 4. Since the $f_b$ input is inverted ($\overline{f_b}$), the output of AND-gate 80 is inhibited when frame counter 79 generates a blanking pulse. Hence, AND-gate 80 performs a subtraction of bits from the $f_2$ signal and, on the average, the signal on path 86 may be represented by $f_2 - kf_b$, where $kf_b = f_s$. This output signal appears as a bit stream with k bits periodically removed at the repetition rate of $f_b$. Digital divider 78 generates a plurality of binary signals at 87, which are used elsewhere in the multiplexer circuit. One of the output signals at 87, labelled $f_1'$, represents a new digital signal having an average bit rate of $(f_2 - kf_b)/N$. This quantity is compared via connection 81 with the input clock signal $f_1$ on path 15 in phase comparator 75. Phase comparator 75 measures the phase difference between $f_1'$ and $f_1'$ and adjusts VCO 77 until this difference is at a minimum. Restated somewhat, the GPLL maintains the following frequency relationship:

$$f_2 = Nf_1 \left( \frac{S_R + 1}{S_R} \right)$$

Hence, the composite line rate, $f_2$, is controlled by the input bit stream rate $f_1$ and by a predetermined fixed ratio determined by the frame counter 79 and the divide-by-N counter 78.

Certain observations can be made about the GPLL. The blanking signal $f_b$ indirectly controls the rate at which time slots are added to the incoming bit streams. The blanking signal $f_b$ is predetermined by the fixed digital logic of the frame counter 79. Since $f_s = kf_b$ in general (where k is the number of consecutively stuffed time slots $\tau_2$ in duration), $f_s$, the stuffing rate, varies only as a function of the frame counter input at 84, which is the $f_2$ clock signal. Hence, it can be shown that the frame counter 79 establishes the following fixed relationship between $f_s, f_2$, and $S_R$:

$$f_s = \frac{f_2}{S_R + 1}.$$

Figure 9:
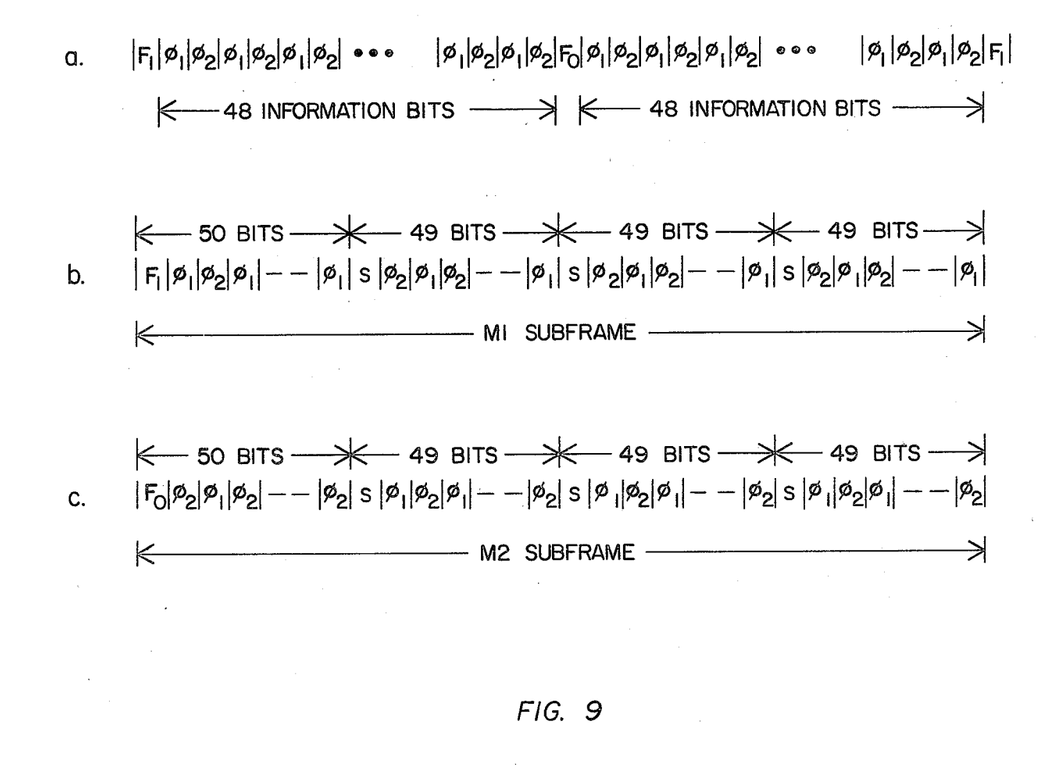
FIG. 9 illustrates typical framing patterns of the multiplexed line signals.

In the frame format shown by line a in FIG. 9, frame counter 79 generates a single blanking pulse ($\tau_2$ seconds in duration) after 48 $f_2$ clock pulses. This relationship is true independent of any variation in $f_1$ or $f_2$. Hence, $S_R$ is fixed by frame counter 79, and $S_R$ is independent of any change in $f_1$ or $f_2$. In systems employing elastic stores, $S_R$ is not fixed by the system, but is variable so that $f_2$ can be fixed and remain independent of changes in the input bit rate $f_1$.

The implementation of GPLL, as shown in FIG. 4, is a very straightforward matter. A phase comparator 75, lowpass filter 76, and VCO 77 are all standard circuits certainly within the capability of a person of ordinary skill in the art. In the feedback circuit, frame counter 79 could be implemented with commercially available digital counters, and AND-gate 80 with a standard logic circuit. The digital divider circuit 78 is sometimes called a fixed-modulo counter. (See *Digital Electronics for Scientists* by H. V. Malmstadt et al, pp. 255 – 262, W. A. Benjamin, Inc., New York, 1969). Some typical designs are given in *Logic Design with Integrated Circuits*, "Special Counters", by William E. Wickes, pp. 209 – 223, John Wiley & Sons, Inc., New York, 1968. Using flip-flops as described therein, output connections 87 would represent the outputs from each flip-flop stage of a divide-by-N binary counter.

A block diagram of a compatible two-channel demultiplexer is shown in FIG. 6, and the associated waveforms are shown in FIG. 8. After transmission over a suitable digital facility, the composite line signal enters the receiver circuit at path 100 as an RZ bit stream. This is shown as waveform A in FIG. 8. The $f_2$ line clock signal is shown as $f_2$ in FIG. 8. A standard clock recovery circuit 102 in FIG. 6 is used to recover the basic timing signal $f_2$. The clock signal $f_2$ must be recovered (or regenerated with a stable oscillator) for use in a sync recovery circuit 104 and for regenerating the timing signals required for demultiplexing the original multiplexed bit streams. In the signal path, the RZ signal is applied to the D-input of a D-type flip-flop 101, and the $f_2$ clock signal 105 is connected to the CP input of flip-flop 101. Since this is an edge-triggered device, flip-flop 101 converts the input RZ signal to an NRZ binary signal. This is shown as waveform B in FIG. 8, and the multiplexed line bit position assignment is shown below waveform B. The sync recovery and framing circuit 104 generates the blanking signal $f_b$. This is the same waveform $f_b$ as was generated at the multiplexer shown in FIGS. 1 and 2. Sync recovery circuits (frame detectors) capable of generating this signal from the clock signal $f_2$ and the input signal 100 are well known in the art. If a low-speed bit stream were inserted during the blanking interval at the multiplexer (via 40 in FIG. 1), the sync recovery circuit 104 also would be used to demultiplex this signal. A reset signal is applied to the counter 107 via connection 90. This signal assures that counter 107 is in the proper state at the beginning of each frame or subframe. At the beginning of each frame, the correct channel bit must be sampled (and removed) from the composite line signal. Without a resetting pulse via 90, divider 107 would be in an unknown state initially and could cause the wrong sampling sequence to be generated on path 108.

Blanking signal $f_b$ is applied via path 106 to the inverting input of AND-gate 103. Thus, the clock signal $f_2$ appears at the output of AND-gate 103 but is inhibited during the blanking interval. The output of AND-gate 103 represents a signal whose average repetition rate is equal to $f_2 - kf_b$. On an instantaneous basis, this means that entry of every $49^{th}$ pulse into the divide-by-two circuit 107 is prevented by the inhibit signal $f_b$ (assuming the frame format is as shown in a, FIG. 9). Digital divider 107 reduces the signal to one-half the repetition rate and thus forms the clock signal $f_1'$, which is the same $f_1'$ clock signal used at the transmitter. Clock signal $f_1'$ via 108 is connected to flip-flop 111, and flip-flop 112 via inverter circuit 109. Appearing at the D-inputs of these two flip-flops is the NRZ signal 110. The $f_1'$ clock signal provides flip-flop 111 with the timing information to enable it to select the channel 1 bits from the composite NRZ signal 110. Thus, the output of this flip-flop on path 113 is an NRZ digital signal consisting of channel 1 bits occurring at the $f_2/2$ rate with the blanking interval still present. This digital signal is shown by waveform E in FIG. 8. By inverting the clock signal $f_1'$ in the inverter 109, flop-flop 112 is enabled to select out the channel 2 bits from the composite NRZ signal 110. Thus, the output on path 114 represents the NRZ channel 2 bit stream having a repetition rate of $f_2/2$ and having the blanking intervals still present. Flip-flops 116 and 117 serve to retime these two bit streams to obtain two parallel signals of bit rate $f_1$. These two signals thus appear on paths 119 and 120. To perform this retiming function, a clock recovery circuit 118 supplies clock signal $f_1$ to flip-flops 116 and 117 on path 115.

Figure 7:
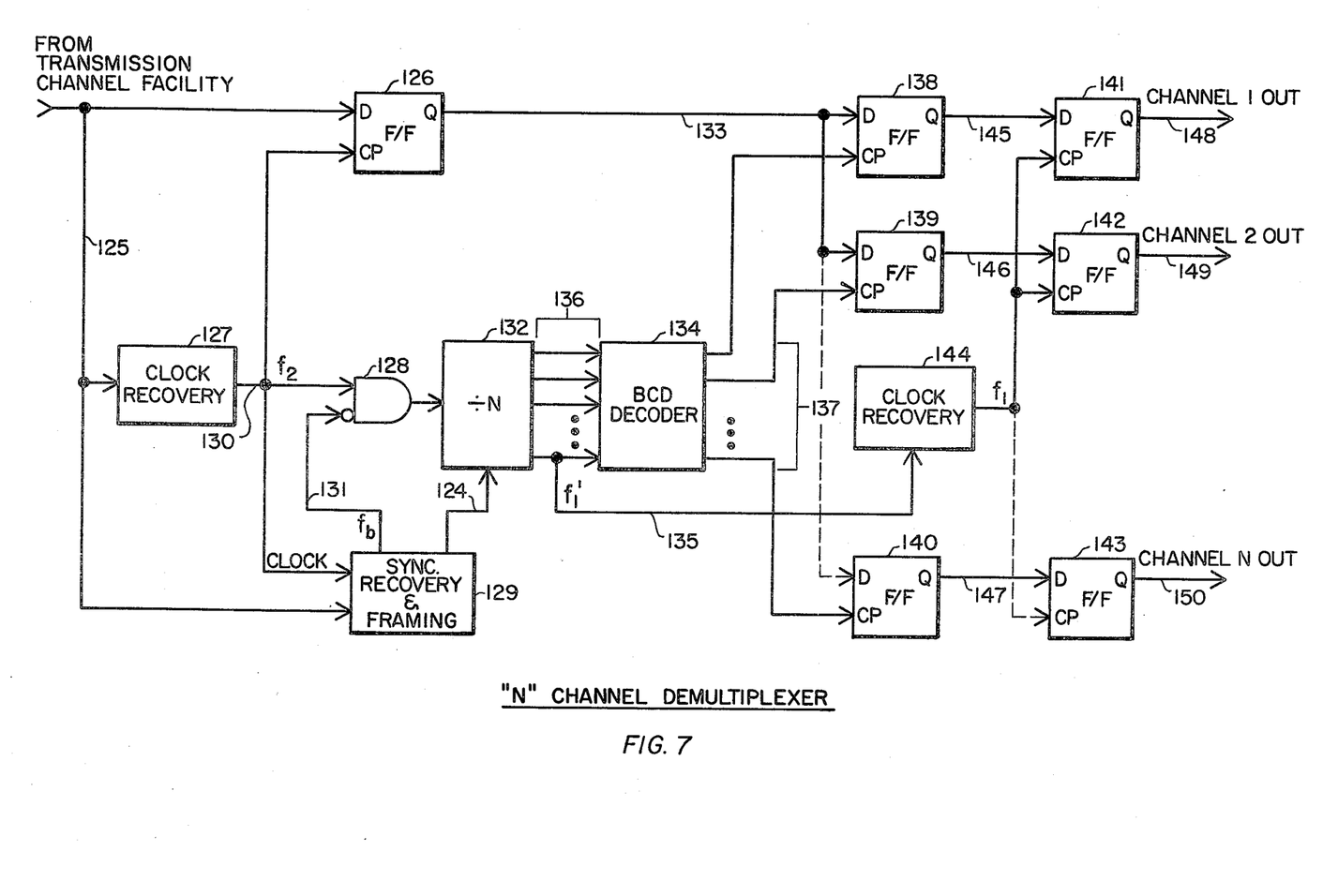
FIG. 7 is a block diagram of a digital demultiplexer in a digital multiplexing system having an output capacity of N bit streams.

FIG. 7 represents a demultiplexer having a channel capacity N operating under the same principles described in reference to FIG. 6. The input RZ composite line signal on path 125 is retimed by the edge-triggered D-type flip-flop 126 to provide an NRZ composite signal on path 133. The clock recovery circuit 127 is used to generate the $f_2$ clock timing which is applied via 130 to the sync recovery and framing circuit 129. With the RZ composite line signal and the $f_2$ clock signal as inputs, the frame detector circuit 129 generates the blanking signal $f_b$ at its output. The blanking signal is again inverted at the input to AND-gate 128, which inhibits the $f_2$ clock signal at the output of the AND-gate. This signal is applied to digital divider circuit 132, which is similar to the divider circuit shown in FIG. 3 as 78. A reset signal applied on 124 assures that the divide-by-N counter is in the proper state prior to each frame. The binary output on leads 136 is applied to the BCD decoder 134 which generates the proper clock signals, on 137, for use in demultiplexing the composite line signal on 133. The N D-type flip-flops 138, 139, and 140 effect a time-division demultiplexing of this NRZ signal by selecting out the proper bits associated with their particular time slot allocation. Thus, the output signals at 145, 146, and 147 represent the channel 1 and channel 2 through channel N bit streams having a timing rate of $f_2/N$. Note that the blanking interval is present. Since the N flip-flops 138, 139, and 140 are inhibited during the blanking interval, the framing bits have been removed at the 145, 146, and 147 paths. The clock pulse $f_1$ is generated from the timing signal $f_1'$ at 135 by a standard clock recovery circuit 144. The clock signal $f_1$ enables the N D-type flip-flops 141, 142, and 143 to retime the N bit streams to provide NRZ parallel outputs with the proper repetition rate of $f_1$. Thus, the signals appearing at 148, 149, and 150 have the same bit rates as the signals which were inserted at the input to the multiplexer in FIG. 3.

The framing and signaling pattern generator shown in FIG. 1 as 31 and in FIG. 3 as 64 generates, as the name implies, the framing and signaling pulses which are inserted into the multiplexed composite line signal. There are several ways in which framing bits can be added to identify the individual line signal components for the demultiplexer. In the selection of a frame format it is useful to consider the stuffing ratio, $S_R$. Waveform a in FIG. 9 illustrates a frame format where an alternating one-zero pattern is inserted after every 48 information bits. $S_R = 48$ for such a system, indicating that for every 48 multiplexed information bits there is one time slot available in which to stuff an added bit, whether it is used for framing or signaling purposes.

In combining two tributaries, each having a bit rate of 1.544 Mg/s, one does not simply double the bit rate. Additional pulses are necessry for control and signaling purposes. Thus, it is typical to use a composite line signal bit rate of 3.152 Mb/s, which requires a stuffing rate of 64 kb/s, (2 × 1.544 + 0.064 = 3.152 Mb/s). In such a two-terminal system, the stuffing rate must be equal to 64 kb/s, which implies a stuffing ratio $S_R$ of 48:25. Since this is not a whole number, a more complex format must be used to produce the desired stuffing ratio. The stuffing ratio of 48:25 requires that one added time slot must be inserted for every 48:25 multiplexed bits or four added time slots for every 193 multiplexed bits. Lines b and c in FIG. 9 illustrate a particular frame format which produces the desired stuffing ratio of 48:25. $F_0$, $F_1$, and S in FIG. 9 are signaling bits and $F_1$ would signify a one bit and $F_0$ would signify a zero bit, i.e., an empty time slot. The S-bit could be used as an alarm signaling bit or could be used as a third low-speed digital data channel. The $\phi_1$ and $\phi_2$ designations indicate information bits from the channel 1 and channel 2 data sources, respectively.

Certainly, there are other framing formats which could be used to produce the desired stuffing ratio, $S_R$. A more complicated pattern could be used at some expense in the complexity of generator 31 or 64. It would be desirable from a performance viewpoint to be able to add more than one framing bit consecutively. Multiple framing bits would decrease the reframe time significantly. The maximum number of bits that may be stuffed in succession in general is equal to N, the number of tributary channels. However, the maximum number should probably be limited to N-1, and the stuffing ratio must, of course, be equal to a value of one or greater. These particular considerations are limited by the system design and the objectives which are considered important.

The invention has been described only with respect to certain specific embodiments. It is to be understood that various modifications can be devised by those skilled in the art without departing from the spirit and scope of the invention. Specifically, the D-type flip-flops shown in FIGS. 1, 6, and 7 could be replaced with other devices which performed an equivalent function. Another modification, wider in scope, would be to remove flip-flops 16 and 17 and have the system function without converting to an NRZ signal. Certainly, this modification would have some drawbacks since exactly one-half the time period would be available in which to stuff added bits into the $f_1$ bit streams. For example, in the two bit stream system shown in FIG. 1, the precession of the sampling instant would be almost ± 180° with respect to the RZ signal rather than ± 90° with NRZ signals. By precessing the sampling instant almost a full bit makes the delays and switching instants (timing) critical.

What is claimed is:

1. In a digital time division multiplexing system, apparatus for multiplexing N synchronous bit streams, each having a bit rate of $f_1$, forming a composite line signal having a predetermined framing pattern and a bit rate of $f_2$, said apparatus comprising:
    means for deriving a multiplex clock having a rate $f_2$ from the bit rate $f_1$;
    first means for converting each of said N synchronous bit streams of bit rate $f_1$ to a converted bit stream, each having a bit rate of $f_2/N$ and each having first periodic gaps inserted at a predetermined fixed rate, such that $Nf_1/(f_2 - Nf_1)$ is a constant, said gaps having a duration of at least $1/f_2$ and not greater than $1/f_1$;
    means for generating framing bits; and
    means for time division multiplexing said converted bit streams with said framing bits so that at least one framing bit appears in one of said first periodic gaps per frame of said composite line signal.

2. Apparatus in accordance with claim 1 wherein said first converting means further comprises:
    means generating a clock signal $f_1'$ having alternately a second gap and a first binary signal, said second gap having a duration the same as said first gap, said first binary signal having a bit rate of $f_2/N$ and a duration such that the average bit rate of said $f_1'$ signal over one frame of said composite line signal is $f_1$; and
    means sampling each of said N bit streams in response to said $f_1'$ clock signal producing said converted bit streams.

3. Apparatus as defined in claim 2 wherein said clock generating means further comprises:
    a phase-locked loop, having a phase comparator, a lowpass filter, and a voltage-controlled oscillator producing a clock signal of bit rate $f_2$, wherein a feedback circuit of said phase-locked loop further comprises:
    means for sequentially counting predetermined numbers of bits from said oscillator and generating a binary blanking signal $f_b$ when each predetermined number of bits is counted, said binary signal $f_b$ having a duration the same as said periodic gaps;
    logic means combining said binary signals $f_2$ and $f_b$ which is the logic AND summation of $f_2$ and $\overline{f_b}$; and
    digital dividing means generating said $f_1'$ clock signal from said binary signal $(f_2 \cdot \overline{f_b})$.

4. Apparatus as defined in claim 3 wherein said sampling means further comprises a first set of N flip-flops, each having a clock input circuit connected to said $f_1'$ clock signal, each having an input circuit operatively connected to one of said N bit streams, and each having an output circuit connected to said multiplexing means.

5. A digital multiplexing system in accordance with claim 4 including receiver means for demultiplexing said composite line signal in response to said frame bits and forming N parallel digital bit streams.

6. A digital multiplexing system in accordance with claim 4 further including second means for converting said N synchronous bit streams to nonreturn-to-zero binary signals.

7. A digital multiplexing system in accordance with claim 5 wherein said receiver means further comprises:
    receiver clock means responsive to said framing bits producing a predetermined sequence of N clock signals; and
    demultiplexer means responsive to said receiver clock signals generating said N bit streams of bit rate $f_1$ from said composite line signal.

8. A digital multiplexing system in accordance with claim 7 wherein said demultiplexer means further comprises:
    a second set of N flip-flops responsive to said sequence of N clock signals, each flip-flop selecting from said composite line signal the particular bits associated with a particular input bit stream,
    a first clock recovery circuit responsive to said sequence of N clock signals generating clock signal $f_1$ of bit rate $f_1$; and
    a third set of N flip-flops responsive to said $f_1$ clock signal reestablishing said $f_1$ timing for each of said selected bit streams.

9. A digital multiplexing system in accordance with claim 8 wherein said receiver clock means further comprises:
    a second clock recovery circuit generating a clock signal $f_2$ of bit rate $f_2$ from said composite line signal;
    a synchronization recovery circuit generating said blanking signal $f_b$ from said $f_2$ clock signal and from said composite line signal;
    a logic circuit generating the logic signal $(f_2 \cdot f_b)$; and
    a divide-by-N binary divider circuit connected to a BCD decoder producing said predetermined sequence of N clock signals from said $(f_2 \cdot f_b)$ signal.

10. A digital multiplexing system in accordance with claim 9 further including in the receiver third means for converting said composite line signal to nonreturn-to-zero binary signals.

11. A digital time-division multiplexer for multiplexing N synchronous bit streams, each having a bit rate of $f_1$, to form a composite line signal having a bit rate of $f_2$, where $f_2 > Nf_1$, said multiplexer comprising:

means for deriving a multiplex clock having a rate $f_2$ from the bit rate $f_1$;

first means for converting each of said N synchronous bit streams of bit rate $f_1$ to a converted bit stream, each having a bit rate of $f_2/N$ and each having first periodic gaps inserted at a predetermined fixed rate, such that $Nf_1/(f_2 - Nf_1)$ is a constant, said gaps having a duration of at least $1/f_2$ and not greater than $1/f_1$; and, means for interleaving said converted bit streams together to form said composite line signal.

* * * * *

UNITED STATES PATENT AND TRADEMARK OFFICE
CERTIFICATE OF CORRECTION

PATENT NO. : 3,995,119
DATED : November 30, 1976
INVENTOR(S) : Alvin L. Pachynski, Jr.

It is certified that error appears in the above-identified patent and that said Letters Patent are hereby corrected as shown below:

Column 4, line 60, "$f_6$", at the beginning of the line, should read -- $f_b$ --.

Column 8, line 4, after "and" (first occurrence), "$f_1'$" should read -- $f_1$ --.

Column 10, line 44, "Mg/s" should read -- Mb/s --.

Column 10, lines 51, 53, 54, & 58 "48:25" should read -- 48.25 --.

Claim 5, column 12, line 21, "frame bits" should read -- framing bits --.

Claim 9, column 12, lines 57 & 60, "$(f_2.f_b)$" should read -- $(f_2 \cdot \bar{f}_b)$ --.

Signed and Sealed this

Twenty-first Day of June 1977

[SEAL]

Attest:

RUTH C. MASON
Attesting Officer

C. MARSHALL DANN
Commissioner of Patents and Trademarks